US007758781B2

(12) United States Patent
Schmeckpeper et al.

(10) Patent No.: US 7,758,781 B2
(45) Date of Patent: Jul. 20, 2010

(54) BLENDS OF HIGH TEMPERATURE RESINS SUITABLE FOR FABRICATION USING POWDERED METAL OR COMPRESSION MOLDING TECHNIQUES

(75) Inventors: Mark R. Schmeckpeper, Kennett Square, PA (US); Timothy D. Krizan, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/154,075

(22) Filed: May 20, 2008

(65) Prior Publication Data

US 2008/0227907 A1  Sep. 18, 2008

Related U.S. Application Data

(63) Continuation of application No. 11/007,957, filed on Dec. 9, 2004, now abandoned.

(60) Provisional application No. 60/531,123, filed on Dec. 19, 2003.

(51) Int. Cl.
  C08L 67/02  (2006.01)
  C08L 79/08  (2006.01)
  B29C 43/02  (2006.01)

(52) U.S. Cl. ............... 264/77; 264/248; 264/275; 264/297.5; 264/328.16; 264/331.11; 264/331.19; 264/531; 264/532; 523/201; 523/205; 524/401; 524/403; 524/404; 524/405; 524/413; 524/433; 524/435; 524/441; 524/442; 524/444; 524/447; 524/449; 524/493; 524/494; 524/495; 525/538; 525/178; 525/179; 525/432; 525/436

(58) Field of Classification Search ............ 264/77, 264/331.11, 331.19, 248, 297.5, 328.15, 264/531, 532, 275; 523/201, 205; 524/401, 524/403, 404, 405, 413, 433, 435, 441, 442, 524/444, 447, 449, 493, 494, 495, 538; 525/178, 525/179, 432, 436

See application file for complete search history.

(56) References Cited

U.S. PATENT DOCUMENTS

| 3,179,614 | A |   | 4/1965  | Edwards              |
|-----------|---|---|---------|----------------------|
| 3,708,459 | A | * | 1/1973  | Lubowitz ..... 528/229 |
| 4,360,626 | A |   | 11/1982 | Manwiller            |
| 4,749,752 | A |   | 6/1988  | Youlu et al.         |
| 4,820,781 | A |   | 4/1989  | Policastro et al.    |
| 4,987,197 | A | * | 1/1991  | Ohta et al. ..... 525/436 |
| 5,179,153 | A |   | 1/1993  | George               |
| 5,718,855 | A |   | 2/1998  | Akahori et al.       |

FOREIGN PATENT DOCUMENTS

| BE | 672858 A    | 5/1968 |
|----|-------------|--------|
| WO | WO00/07074  | 2/2000 |

OTHER PUBLICATIONS

International Search Report for PCT/US2004/042304 dated Apr. 20, 2005.

* cited by examiner

*Primary Examiner*—Ana L Woodward

(57) ABSTRACT

The invention relates to a resin polymer blend comprising at least two dry blended, non-melt processable resin polyimide particulates, wherein the non-melt processable resin polyimide articulates are molded by compression molding.

12 Claims, No Drawings

BLENDS OF HIGH TEMPERATURE RESINS SUITABLE FOR FABRICATION USING POWDERED METAL OR COMPRESSION MOLDING TECHNIQUES

CROSS-REFERENCE TO RELATED APPLICATION

This application claims the benefit of U.S. Provisional Application No. 60/531,123, filed Dec. 19, 2003, and U.S. application Ser. No. 11/007,957, filed Dec. 9, 2004.

FIELD OF THE INVENTION

This invention relates to a dry blended, particulate, high temperature polymer, which is moldable using powdered metal or compression molding technology.

BACKGROUND OF THE INVENTION

High temperature resins are increasingly replacing metals in the fabrication of machinery parts and mechanical components. As a result, significant reductions in production and replacement costs for the machinery parts and mechanical components have been realized. To replace metals in machinery parts and mechanical components, the high temperature resins should have high resistance to mechanical wear, surface stress, and extreme temperature conditions. Additionally, the performance characteristics of the high temperature resins should equal or exceed that of the metals being replaced.

Polyimides are particularly preferable high temperature resins because of their mechanical strength, dimensional stability, thermal stability, chemical stability, flame retardance, and dielectric properties. Polyimides, such as those described in U.S. Pat. No. 3,179,614 issued to Edwards on Apr. 20, 1965, can be used in a wide variety of commercial applications. The outstanding performance characteristics of these polymers under stress and at high temperatures have made them useful in the form of bushings, seals, electrical insulators, compressor vanes and impellers, pistons and piston rings, gears, thread guides, cams, brake linings, and clutch faces.

Blending of resin polymers to improve the physical characteristics of the blend over the individual resin polymers is well known in the art. Known techniques used in processing resin polymers include dry blending, direct compression, wet granulation, melt blending, coprecipitation from solution, and spray freezing of frozen particles. Dry blending of resins is advantageous because of the absence of solvents and other liquids that may contribute to residual moisture. Dry blending is also advantageous because of its simplicity compared to other mixing methods.

It is important that a molded article have low moisture pickup because absorbed moisture can negatively affect: the dimensional stability of the molded article through, for example, hygroscopic expansion; mechanical properties such as tensile strength; electrical properties; and hydrolytic stability. Thus, it is desirable to lower the moisture pickup of a molded article without changing any of the properties of the article.

U.S. Pat. No. 4,820,781 issued to Policastro et al. on Apr. 11, 1989, discloses polyetherimide-silicone copolymer blends with a glass transition temperature of at least 190° C.

U.S. Pat. No. 4,987,197 issued to Ohta et al. on Jan. 22, 1991, discloses melt processible polyimide-aromatic polyamideimide blends that can be used in various molding applications such as injection molding, compression molding, transfer molding, and extrusion molding.

U.S. Pat. No. 5,179,153 issued to George on Jan. 12, 1993, discloses polyimide compositions containing graphite filler and polytetrafluoroethylene filler.

Accordingly, one aspect of this invention is to provide dry blended resin particulates wherein the moisture pickup of a molded article comprising the dry blended resin particulates is lower than the level expected based on the moisture pickups of the individual components of the blend. Another aspect of the invention is that these dry blended resin particulates are suitable for compression molding.

SUMMARY OF THE INVENTION

One aspect of this invention is to provide a resin blend comprising at least two dry blended, non-melt processible resin particulates, wherein the at least two dry blended resin particulates are molded by compression molding. Another aspect of the invention is a compression molded article comprising the resin blend. Another aspect of this invention is to provide a process for producing a compression molded article comprising mixing at least two non-melt processible resin particulates by dry blending and molding the mixture by compression molding. Another aspect of the invention is a resin blend comprising at least two blended, non-melt processible polyimide resin particulates, wherein the at least two blended, non-melt processible polyimide resin particulates are molded by compression molding.

DETAILED DESCRIPTION OF THE INVENTION

Applicants specifically incorporate the entire content of all cited references in this disclosure. Where a range of numerical values is recited herein, unless otherwise stated, the range is intended to include the endpoints thereof, and all integers and fractions within the range. It is not intended that the scope of the invention be limited to the specific values recited when defining a range.

In the context of this disclosure, a number of terms shall be utilized.

The term "compression molding" as used herein means a method for preparing parts from a polymer or polymeric mixture by the application of both heat and pressure whereby the polymer is not melted. The application of heat and pressure can be simultaneous or sequential. Methods of compression molding include direct forming and sintering, isostatic molding, and other methods known to one of ordinary skill in the art.

The term "dry blending" as used herein means the process by which two or more particulate resins are thoroughly mixed while maintaining the integrity of the individual particles and without benefit of an additional material such as a solvent to aid in the processing. A "dry blend" is thus a resultant mixture of a dry blending process.

The term "resin particulate" as used herein means polymers, optionally comprising encapsulated filler, with an average particle size of from about 5 μm to about 500 μm. Preferably, the resin particulate has an average particle size of from about 20 μm to about 400 μm. More preferably, the resin particulate has an average particle size of from about 30 μm to about 300 μm. Average particle size can be determined by methods such as an aqueous slurry using a Coulter Multisizer.

The term "moisture pickup" means the weight percent of water absorbed by a tensile bar after immersion in water for two weeks at room temperature. Thus, the "expected moisture pickup" for a resin blend is the amount of weight gain predicted from calculating the weighted average of the moisture pickups of two or more tensile bars prepared from each of the individual base resins used to prepare the blend.

The present invention relates to a resin blend comprising at least two dry blended, non-melt processible resin particulates, wherein the at least two dry blended resin particulates are molded by compression molding. Another aspect of the invention is a compression molded article comprising the resin blend.

It was unexpectedly discovered that dry blending followed by compression molding of non-melt processible resin particulates resulted in reduced moisture pickup of the resin blend compared to that expected from the weighted average of the moisture pickup of the individual resin particulates. Improvements in moisture pickup of up to 55% below expected values in compression molded articles comprising the resin blends have been observed.

A desirable group of polymers suitable for use in the present invention are those that retain excellent mechanical properties at high temperatures. Polymers in this group, however, often melt at very high temperatures or decompose without melting. In addition, their viscosities in the melt phase are extremely high. Therefore, these polymers are considered to be intractable, that is, non-melt processible. Thus, forming these polymers into shaped articles is expensive at best and impossible in many cases.

For example, nylons of hexamethylene diamine and terephthalic acid exhibit excellent temperature resistance but cannot be melt-spun or molded because they decompose before their crystalline melting temperatures are reached. Likewise, many other wholly aromatic polymers such as polyimides of pyromellitic anhydride and aromatic diamines cannot be melt processed. Powder processing and sintering techniques have been used to process such intractable polymers into useable articles.

Thus, in the context of the present invention, "non-melt processible" refers to resin particulates that either have a melting transition temperature ("$T_m$") of at least 400° C. in the case of resin particulates that have a discernable melting point or have no discernable melting point but are stable in temperatures up to at least 400° C.

The resin particulate is derived from a base polymer that is non-melt processible. The base polymer is preferably an organic polymer and is more preferably a synthetic polymer that is prepared in a polymerization reaction. The base polymer can be, for example, a polyimide, a polybenzoxazole, a polybenzimidazole, a polyaramid, a polyarylene, a polyether sulfone, a polyarylene sulfide, a polyimidothioether, a polyoxamide, a polyimine, a polysulfonamide, a polysulfonimide, a polyimidine, a polypyrazole, a polyisoxazole, a polythiazole, a polybenzothiazole, a polyoxadiazole, a polytriazole, a polytriazoline, a polytetrazole, a polyquinoline, a polyanthrazoline, a polypyrazine, a polyquinoxaline, a polyquinoxaline, a polyquinazolone, a polytriazine, a polytetrazine, a polythiazone, a polypyrrone, a polyphenanthroline, a polycarbosilane, a polysiloxane, a polyamideimide, or copolymers or blends thereof.

Preferably, at least one of the dry blended resin particulates is a polyimide resin particulate. More preferably, at least two of the dry blended resin particulates are polyimide resin particulates. Even more preferably, all of the dry blended resin particulates are polyimide particulate resins.

In embodiments wherein at least two of the resin particulates are polyimide resin particulates, the invention provides for a resin blend comprising at least two blended, non-melt processible polyimide particulates, wherein the at least two blended, non-melt processible polyimide particulates are molded by compression molding. Resin blends of these polyimide embodiments can optionally contain water and/or additional solvents as known to one of ordinary skill in the art and are thus not necessarily a dry blend. In these polyimide embodiments, water and/or additional solvents can be added in amounts as is necessary to produce functional blends.

The polyimide contains the characteristic —CO—NR—CO— group as a linear or heterocyclic unit along the main chain of the polymer backbone. The polyimide can be obtained, for example, from the reaction of monomers such as an organic tetracarboxylic acid, or the corresponding anhydride or ester derivative thereof, with an aliphatic or aromatic diamine.

A polyimide precursor as used to prepare a polyimide is an organic polymer that becomes the corresponding polyimide when the polyimide precursor is heated or chemically treated. In certain embodiments of the thus-obtained polyimide, about 60 to 100 mole percent, preferably about 70 mole percent or more, more preferably about 80 mole percent or more, of the repeating units of the polymer chain thereof has a polyimide structure as represented, for example, by the following formula:

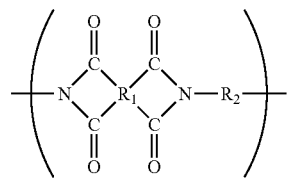

wherein $R_1$ is a tetravalent aromatic radical having 1 to 5 benzenoid-unsaturated rings of 6 carbon atoms, the four carbonyl groups being directly bonded to different carbon atoms in a benzene ring of the $R_1$ radical and each pair of carbonyl groups being bonded to adjacent carbon atoms in the benzene ring of the $R_1$, radical; and $R_2$ is a divalent aromatic radical having 1 to 5 benzenoid-unsaturated rings of carbon atoms, the two amino groups being directly bonded to different carbon atoms in the benzene ring of the $R_2$ radical.

Preferred polyimide precursors are aromatic, and provide, when imidized, polyimides in which a benzene ring of an aromatic compound is directly bonded to the imide group. An especially preferred polyimide precursor includes a polyamic acid having a repeating unit represented, for example, by the following general formula, wherein the polyamic acid can be either a homopolymer or copolymer of two or more of the repeating units:

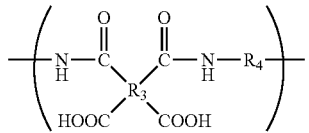

wherein $R_3$ is a tetravalent aromatic radical having 1 to 5 benzenoid-unsaturated rings of 6 carbon atoms, the four carbonyl groups being directly bonded to different carbon atoms in a benzene ring of the $R_3$ radical and each pair of carbonyl groups being bonded to adjacent carbon atoms in the benzene ring of the $R_3$ radical; and $R_4$ is a divalent aromatic radical having 1 to 5 benzenoid-unsaturated rings of carbon atoms, the two amino groups being directly bonded to different carbon atoms in the benzene ring of the $R_4$ radical.

Typical examples of a polyamic acid having a repeating unit represented by the general formula above are those obtained from pyromellitic dianhydride ("PMDA") and diaminodiphenyl ether ("ODA") and 3,3',4,4'-biphenyltetracarboxylic dianhydride ("BPDA") and ODA. When subjected to ring closure, the former becomes poly(4,4'-oxydiphenylenepyromellitimide) and the latter becomes poly(4, 4'-oxydiphenylene-3,3',4,4'-biphenyltetracarboxy imide).

A typical example of a polyimide prepared by a solution imidization process is a rigid, aromatic polyimide composition having the recurring unit:

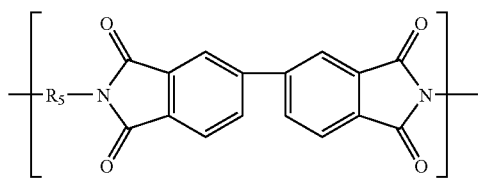

wherein $R_5$ is greater than 60 to about 85 mole percent praraphenylene diamine ("PPD") units and about 15 to less than 40 mole percent metaphenylene diamine ("MPD") units.

The tetracarboxylic acids preferably employed in the practice of the invention, or those from which derivatives useful in the practice of this invention can be prepared, are those having the general formula:

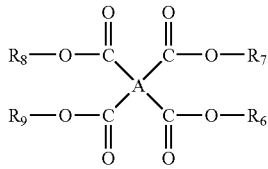

wherein A is a tetravalent organic group and $R_6$ to $R_9$, inclusive, comprise hydrogen or a lower alkyl, and preferably methyl, ethyl, or propyl. The tetravalent organic group A preferably has one of the following structures:

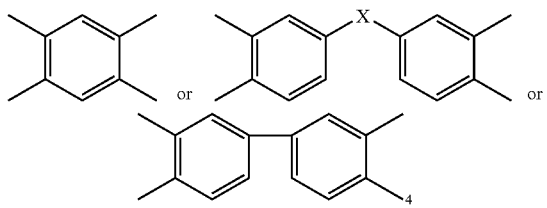

wherein X comprises at least one of

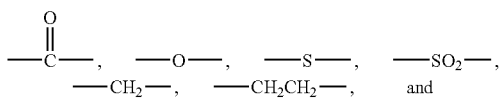

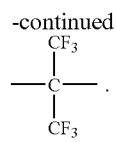

As the aromatic tetracarboxylic acid component, there can be mentioned aromatic tetracarboxylic acids, acid anhydrides thereof, salts thereof and esters thereof. Examples of the aromatic tetracarboxylic acids include 3,3',4,4'-biphenyltetracarboxylic acid, 2,3,3',4'-biphenyltetracarboxylic acid, pyromellitic acid, 3,3',4,4'-benzophenonetetracarboxylic acid, 2,2-bis(3,4-dicarboxyphenyl)propane, bis(3,4-dicarboxyphenyl)methane, bis(3,4-dicarboxyphenyl)ether, bis(3,4-dicarboxyphenyl)thioether, bis(3,4-dicarboxyphenyl)phosphine, 2,2-bis(3',4'-dicarboxyphenyl)hexafluoropropane, and bis(3,4-dicarboxyphenyl)sulfone.

These aromatic tetracarboxylic acids can be employed singly or in combination. Preferred is an aromatic tetracarboxylic dianhydride, and particularly preferred are 3,3',4,4'-biphenyltetracarboxylic dianhydride, pyromellitic dianhydride, 3,3',4,4'-benzophenonetetracarboxylic dianhydride, and mixtures thereof.

As an organic aromatic diamine, use is preferably made of one or more aromatic and/or heterocyclic diamines, which are themselves known to the art. Such aromatic diamines can be represented by the structure: $H_2N-R_{10}-NH_2$, wherein $R_{10}$ is an aromatic group containing up to 16 carbon atoms and, optionally, containing up to one hetero atom in the ring, the hetero atom comprising —N—, —O—, or —S—. Also included herein are those $R_{10}$ groups wherein $R_{10}$ is a diphenylene group or a diphenylmethane group. Representative of such diamines are 2,6-diaminopyridine, 3,5-diaminopyridine, meta-phenylene diamine, para-phenylene diamine, p,p'-methylene dianiline, 2,6-diamino toluene, and 2,4-diaminotoluene.

Other examples of the aromatic diamine components, which are merely illustrative, include benzene diamines such as 1,4-diaminobenzene, 1,3-diaminobenzene, and 1,2-diaminobenzene; diphenyl(thio)ether diamines such as 4,4'-diaminodiphenylether, 3,4'-diaminodiphenylether, 3,3'-diaminodiphenylether, and 4,4'-diaminodiphenylthioether; benzophenone diamines such as 3,3'-diaminobenzophenone and 4,4'-diaminobenzophenone; diphenylphosphine diamines such as 3,3'-diaminodiphenylphosphine and 4,4'-diaminodiphenylphosphine; diphenylalkylene diamines such as 3,3'-diaminodiphenylmethane, 4,4'-diaminodiphenylmethane, 3,3'-diaminodiphenylpropane, and 4,4'-diaminodiphenylpropane; diphenylsulfide diamines such as 3,3'-diaminodiphenylsulfide and 4,4'-diaminodiphenylsulfide; diphenylsulfone diamines such as 3,3'-diaminodiphenylsulfone and 4,4'-diaminodiphenylsulfone; and benzidines such as benzidine and 3,3'-dimethylbenzidine.

Other useful diamines have at least one non-heteroatom containing aromatic rings or at least two aromatic rings bridged by a functional group.

These aromatic diamines can be employed singly or in combination. Preferably employed as the aromatic diamine component are 1,4-diaminobenzene, 1,3-diaminobenzene, 4,4'-diaminodiphenylether, and mixtures thereof.

A polyamic acid can be obtained by polymerizing an aromatic diamine component and an aromatic tetracarboxylic acid component preferably in substantially equimolar amounts in an organic polar solvent. The amount of all monomers in the solvent can be in the range of about 5 to about 40 weight percent, more preferably in the range of about 6 to about 35 weight percent, and most preferably in the range of about 8 to about 30 weight percent. The temperature for the reaction generally is not higher than about 100° C., preferably in the range of about 10° C. to 80° C. The time for the polymerization reaction generally is in the range of about 0.2 to 60 hours.

The process by which a polyimide is prepared can also vary according to the identity of the monomers from which the polymer is made up. For example, when an aliphatic diamine and a tetracarboxylic acid are polymerized, the monomers form a complex salt at ambient temperature. Heating of such a reaction mixture at a moderate temperature of about 100 to about 150° C. yields low molecular weight oligomers (for example, a polyamic acid), and these oligomers can, in turn, be transformed into higher molecular weight polymer by further heating at an elevated temperature of about 240 to about 350° C. When a dianhydride is used as a monomer instead of a tetracarboxylic acid, a solvent such as dimethylacetamide or N-methylpyrrolidinone is typically added to the system. An aliphatic diamine and dianhydride also form oligomers at ambient temperature, and subsequent heating at about 150 to about 200° C. drives off the solvent and yields the corresponding polyimide.

As an alternative to the use of an aliphatic diamine and/or an aliphatic diacid or dianhydride, as described above, an aromatic diamine is typically polymerized with a dianhydride in preference to a tetracarboxylic acid, and in such a reaction a catalyst is frequently used in addition to a solvent. A nitrogen-containing base, phenol, or amphoteric material can be used as such a catalyst. Longer periods of heating can be needed to polymerize an aromatic diamine.

The ring closure can also be effected by conventionally used methods such as a heat treatment or a process in which a cyclization agent such as pyridine and acetic anhydride, picoline and acetic anhydride, 2,6-lutidine and acetic anhydride, or the like is used.

In the formation of a polyetherimide from a bisphenol and a dinitrobisimide, the bisphenoxide salt of the bisphenol is first obtained by treatment with caustic soda, followed by an azeotropic distillation to obtain the anhydrous bisphenoxide salt. Heating the bisphenoxide salt and the dinitrobisimide at a temperature of about 80 to about 130° C. in a solvent yields the polyetherimide.

As the organic polar solvent employable in the above-described polymerization reaction, there can be mentioned solvents capable of homogeneously dissolving each monomer of the aromatic diamine component or the aromatic tetracarboxylic acid component, an oligomer produced by the monomers or a low-molecular polyamic acid. Examples of such organic polar solvents include amide solvents such as N,N-dimethylformamide, N,N-dimethylacetamide, N-methyl-2-pyrrolidone, N-methylcaprolactam, pyrrolidone; and dimethylsulfoxide, hexamethylsulfonamide, dimethylsulfone, tetramethylenesulfone, dimethyltetramethylenesulfone, pyridine, tetrahydrofuran, and butyrolactone. These organic polar solvents can be used in combination with other solvents such as benzene, toluene, benzonitrile, xylene, solvent naphtha, and dioxane.

In addition to other methods known in the art, a polyimide can also be prepared from the reaction of a polyisocyanate and a dianhydride.

When only one of the resin particulates is a polyimide resin particulate, the polyimide resin particulate can be used in the range of about 5 weight percent to about 95 weight percent and preferably the polyimide resin particulate can be used in the range of about 20 weight percent to about 80 weight percent, the percentages being based on the total weight of all of the resin particulates in the resin blend.

When at least two polyimide resin particulates are present, the polyimide resin particulates in addition to any other resin particulates present in the blend can be used in any amount as one of ordinary skill in the art would recognize as being advantageous for the intended use of the resin blend.

In an alternative embodiment, a particulate filler and/or a fibrous filler uniformly dispersed in an organic solvent can be added to the production system at an appropriate stage from before the time of the synthesis of the polymeric precursor and, in the embodiments containing polyimides, through to the time of the imidization of the polyimide precursor. When fillers encapsulated in polyimides are desired, the organic solvent that can be used for uniformly dispersing a particulate filler and/or a fibrous filler is usually the same as used for the polymerization of the acid dianhydride and the diamino compound. Although the particulate or fibrous filler can be added as such, it is preferred that the filler is sufficiently dispersed in a prescribed amount of such organic solvent. Addition of the filler in a dispersed state in an organic solvent can be preferred because the filler previously wetted with the organic solvent can be uniformly dispersed in the reaction system and be more easily incorporated into the particle of the base polymer.

The filler is typically not added directly to the reaction system but typically is uniformly dispersed in an organic solvent in advance and then added to the system. Thus, the filler can uniformly be dispersed in the reaction system, and, in one embodiment, a polymeric particle is precipitated around the dispersed filler.

In embodiments containing polyimides, the addition of the organic solvent having uniformly dispersed therein the filler can be effected at any stage before commencement of imidization of the polyimide precursor, that is, before precipitation of a polymeric particle. For example, the uniform filler dispersion can be added before addition of the acid dianhydride, for example, aromatic tetracarboxylic acid dianhydride, or the diamino compound, for example, aromatic diamino compounds, or it can be added to the polyimide precursor solution prior to imidization.

Uniform dispersion of the filler in the organic solvent can be carried out by using a dispersing device, for example a ball mill, a sand mill, attritor, a three-roll mill, a bead mill, a jet mill, a vibration mill, a disper, an impeller mill, a flow jet mixer, a homogenizer, a colloid mill, etc., or a general stirrer, for example, agitator.

Suitable fillers include various kinds, such as those imparting high strength properties to polymeric molded products, for example, glass fibers, carbon fibers, ceramic fibers, boron fibers, glass beads, whiskers, or diamond powders; those imparting heat dissipation properties to polymeric molded products, for example, alumina or silica; those imparting corona resistance, for example, natural mica, synthetic mica, or alumina; those imparting electric conductivity, for example, carbon black, a silver powder, a copper powder, an aluminum powder, or a nickel powder; or those imparting heat resistance to polymeric molded products, for example, aramide fibers, metal fibers, ceramic fibers, whiskers, silicon carbide, silicon oxide, alumina, a magnesium powder, or a titanium powder. In addition, a fluorine-containing fine powder, for example, polytetrafluoroethylene, can be used in order to reduce a coefficient of friction. These fillers can be used individually or in combination of two or more thereof.

When encapsulated fillers are included, the polymeric component can be present in a range of about 30 weight percent to about 99 weight percent, the percentages being based on the total weight of all of the resin particulates in the resin blend.

The amount of the encapsulated filler to be used can appropriately be determined depending on characteristics required for the polymeric products, and usually ranges from about 1 weight percent to about 70 weight percent, the percentages being based on the total weight of all of the resin particulates in the resin blend.

In an alternative embodiment where fillers are added to the resin particulates, but are not encapsulated in the resin particulates, the fillers can be used in a range from about 1 to about 15 weight percent, the percentages being based on the total weight of all of the resin particulates in the resin blend. In this embodiment, polymeric particulates can be used in a range of from about 85 to about 99 weight percent, the percentages being based on the total weight of all of the resin particulates in the resin blend.

Resin blends resulting from mixtures of resin particulates comprising both encapsulated and unencapsulated fillers are also within the scope of the present invention.

Another aspect of the invention provides for a method of producing a resin blend comprising mixing at least two non-melt processible resin particulates. A further aspect of the invention provides for a method of producing a compression molded article comprising mixing at least two non-melt processible resin particulates by dry blending and molding the mixture by compression molding.

Suitable blending hardware includes, but is not limited to, drum rollers, ribbon blenders, v-cone blenders, double cone blenders, tote bin tumblers, a fluid bed, a Littleford-type mixer, a Nauta-type blender, a Forberg, a rotating drum with internal baffles, and gravity fall through static mixer. Other blending hardware known to one of ordinary skill in the art can also be used.

The resin blend can further include other additives that do not depreciate the overall characteristics of the blend, as would be evident to one of ordinary skill in the art. For example, a wide variety of polymer particles, such as those made from any of the aforementioned base particles, can be blended with the non-melt processible resin particulates of the invention. Additives, like the resin particulates of the invention, should be non-melt processible. Other additives such as antioxidants, heat stabilizers, ultraviolet absorbers, flame retardants, auxiliary flame retardants, antistatic agents, lubricants, and coloring agents can also be added as long as the essential properties of the blend are not affected.

Molded articles that demonstrate lower moisture gain offer benefits. For example, moisture pick-up of a part, that is, a constituent member of a machine or other apparatus, can alter the dimensions of the part, impacting the ability to install easily the component part into an assembly and/or impacting the performance of the part.

For example, aircraft bushings can be produced to certain toleranced dimensions, but after production the bushings can pick-up moisture in humid environments, causing the dimensions to change from the die. The inspection of the bushings can be based on either the saturated state or the dry state. Or, if such states are not controlled, the resulting capability to maintain a specific tolerance will be reduced, potentially requiring the design tolerances of the mating components to be more tightly controlled for effective functioning of the assembly, impacting costs.

If inspected while in the saturated state, the bushings can dry in operation when exposed to high thermal conditions, causing dimensional change, impacting the clearance between the bushing and the mating components. Non-optimal clearance can impact bushing wear life and/or increase actuation torque thereby requiring heavier actuation systems that can provide more torque to actuate the system.

If the bushing is inspected in the dry state, the part can become saturated during the time between inspection and assembly, causing dimensional change, potentially causing installation difficulty if the product is not pre-dried before assembly or stored in a manner to prevent moisture uptake. The pre-drying step adds cost as does delays in assembly.

Another example a use in which low-moisture uptake properties are advantages is in articles for semiconductor chip manufacturing. At various testing or processing steps, articles with very small holes are machined into the article comprising a resin blend of the invention. The accurate size and position of these holes within the article is important to the function and life of the component. Moisture gain during machining or use can cause either dimensional inaccuracy during machining, leading to the loss of the machining value, or can cause a dimensional shift during use of the part leading to ineffective performance of the article.

Another example of a material's low-moisture uptake properties benefiting an article is the material's use in environments that require low-outgassing.

These aforementioned examples are meant for illustration purposes only and are not meant to encompass the only possible beneficial uses of a low-moisture uptake material.

EXAMPLES

The present invention is further defined in the following Examples. It should be understood that these Examples, while indicating preferred embodiments of the invention, are given by way of illustration only. From the above discussion and these Examples, one skilled in the art can ascertain the preferred features of this invention, and without departing from the spirit and scope thereof, can make various changes and modifications of the invention to adapt it to various uses and conditions.

The meaning of abbreviations is as follows: "min." means minute(s), "ml" means milliliter(s), "g" means gram(s), "PMDA" means pyromellitic dianhydride, "ODA" means diaminodiphenyl ether, "BPDA" means 3,3',4,4'-biphenyltetracarboxylic dianhydride, "BTDA" means 3,3',4,4'-benzophenone tetracarboxylic dianhydride, "PPD" means paraphenylene diamine, "MPD" means metaphenylene diamine, "kpsi" means thousand pounds per square inch, and "wt %" means weight percent(age).

General Method for Preparation and Testing of Blends

Resin blends were prepared by placing a total of 30 g of two of the base resins described in Table 1 in a 250 ml jar. The mixture was gently tumbled for 5 min. and dried overnight in a vacuum oven at 150° C. Tensile bars were prepared by the method set forth in U.S. Pat. No. 4,360,626. Moisture pickup studies were conducted by immersing dried tensile bars in water at room temperature and measuring the change in weight after two weeks. Tensile bars comprising resin blends and tensile bars comprising the individual base resins used to prepare the resin blends were tested simultaneously.

TABLE 1

| Description | Dianhydride | mole %/Diamine | Additive wt % | % Moisture Pickup |
|---|---|---|---|---|
| Base Resin 1 | BPDA | 70% PPD 30% MPD | none | 0.57 |
| Base Resin 2 | BPDA | 70% PPD 30% MPD | none | 0.47 |
| Base Resin 3 | BPDA | 70% PPD 30% MPD | graphite 9% kaolinite 1% | 0.60 |
| Base Resin 4 | BPDA | 70% PPD 30% MPD | graphite 50% | 0.29 |
| Base Resin 5 | BTDA | ODA | none | 2.97 |
| Base Resin 6 | PMDA | ODA | none | 2.19 |
| Base Resin 7 | PMDA | ODA | none | 2.59 |
| Base Resin 8 | PMDA | ODA | none | 2.51 |
| Base Resin 9 | PMDA | ODA | graphite 15% | 1.91 |
| Base Resin 10 | PMDA | ODA | graphite 15% | 1.74 |
| Base Resin 11 | PMDA | ODA | graphite 15% | 2.00 |
| Base Resin 12 | PMDA | ODA | graphite 65% | 0.64 |
| Base Resin 13 | PMDA | ODA | graphite 10% | 3.54 |
| Base Resin 14 | BPDA | PPD | graphite 2.5% | 0.39 |
| Base Resin 15 | BPDA | PPD | graphite 2.5% | 0.34 |
| Base Resin 16 | BPDA | PPD | graphite 2.5% | 1.47 |

Examples 1-15

As shown in Table 2, all resin blends exhibited reduced moisture pickup.

TABLE 2

| Example | Component A | wt % | Component B | wt % | % Moisture Pickup (actual) | % Moisture Pickup (expected) |
|---|---|---|---|---|---|---|
| 1 | Base Resin 1 | 75 | Base Resin 6 | 25 | 0.75 | 0.98 |
| 2 | Base Resin 1 | 50 | Base Resin 6 | 50 | 1.18 | 1.38 |
| 3 | Base Resin 1 | 25 | Base Resin 6 | 75 | 1.53 | 1.78 |
| 4 | Base Resin 9 | 75 | Base Resin 3 | 25 | 1.48 | 1.55 |
| 5 | Base Resin 9 | 50 | Base Resin 3 | 50 | 1.17 | 1.26 |
| 6 | Base Resin 9 | 25 | Base Resin 3 | 75 | 0.85 | 0.93 |
| 7 | Base Resin 2 | 75 | Base Resin 8 | 25 | 0.69 | 1.10 |
| 8 | Base Resin 2 | 50 | Base Resin 8 | 50 | 1.19 | 1.53 |
| 9 | Base Resin 2 | 25 | Base Resin 8 | 75 | 1.83 | 2.09 |
| 10 | Base Resin 14 | 50 | Base Resin 13 | 50 | 0.88 | 1.97 |
| 11 | Base Resin 15 | 50 | Base Resin 10 | 50 | 0.77 | 1.04 |
| 12 | Base Resin 7 | 50 | Base Resin 5 | 50 | 2.52 | 2.74 |
| 13 | Base Resin 11 | 50 | Base Resin 16 | 50 | 1.61 | 1.74 |
| 14 | Base Resin 4 | 60 | Base Resin 12 | 40 | 0.41 | 0.43 |
| 15 | Base Resin 4 | 40 | Base Resin 12 | 60 | 0.47 | 0.50 |

What is claimed is:

1. A resin polymer blend comprising a first type base resin dry blended, non-melt processable polyimide particulates and a different second type base resin dry blended, non-melt processable polyimide particulates combined and molded by compression molding wherein the moisture pickup of said resin polymer blend is less than the weighted average of the moisture pickup of each base resin.

2. The resin polymer blend of claim 1, wherein said dry blended, non-melt processable polyimide particulates have an average particle size of from about 5 μm to about 500 μm.

3. The resin polymer blend of claim 1 or 2, further comprising at least one filler.

4. The resin polymer blend of claim 3, wherein the at least one filler is present in an amount of from about 1 weight percent to about 70 weight percent of the total resin blend.

5. The resin polymer blend of claim 3, wherein said filler has a polymeric particle precipitated around said filler.

6. The resin polymer blend of claim 5 wherein said polymeric particle precipitated around said filler is a polyimide.

7. The resin polymer blend of claim 3 wherein said filler is selected from the group consisting of glass fibers, carbon fibers, ceramic fibers, boron fibers, glass beads, diamond powders, alumina, silica, kaolinite, mica, carbon black, graphite, silver powder, copper powder, aluminum powder, nickel powder, magnesium powder, titanium powder, aramide fibers, metal fibers, silicon carbide, polytetrafluoroethylene and combinations of two or more thereof.

8. A compression molded article comprising the resin polymer blend of claim 1 or 2.

9. A method of using the composition of claim 1 to produce a compression molded article, said method comprising: (a) mixing said dry blended, non-melt processable polyimide particulates, wherein each polyimide of the polyimide particulates are formed by the polymerization of monomers of a diamine and an organic tetracarboxylic acid or the corresponding dianhydride or ester derivative thereof; and (b) molding the mixture of step (a) by compression molding.

10. The method of claim 9 further comprising the step of adding at least one filler.

11. A compression molded article produced by the method of claim 9.

12. The resin polymer blend of claim 1, wherein said resin polymer blend is prepared from:
(a) 75 wt % of BPDA with 70 mol % PPD/30 mol % MPD and 25 wt % PMDA/ODA;
(b) 50 wt % BPDA with 70 mol % PPD/30 mol % MPD and 50 wt % PMDA/ODA;
(c) 25 wt % BPDA with 70 mol % PPD/30 mol % MPD and 75 wt% PMDA/ODA;
(d) 75 wt% PMDA/ODA, comprising 15 wt % graphite and 25 wt % BPDA with 70 mol % PPD/30 mol % MPD, and comprising 9 wt % graphite and comprising 1 wt % kaolinite;

(e) 50 wt % PMDA/ODA, comprising 15 wt % graphite and 50 wt % BPDA with 70 mol % PPD/30 mol % MPD, and comprising 9wt % graphite and comprising 1 wt % kaolinite;

(f) 25 wt % PMDA/ODA, comprising 15 wt % graphite and 75 wt % BPDA with 70 mol % PPD/30 mol % MPD, and comprising 9 wt % graphite and comprising 1 wt % kaolinite;

(g) 50 wt % BPDA with PPD, comprising 2.5 wt % graphite and 50 wt % PMDA with ODA, comprising 10 wt% graphite;

(h) 50 wt % BPDA with PPD, comprising 2.5 wt % graphite and 50 wt % PMDA with ODA, comprising 15 wt % graphite;

(i) 50 wt % PMDA with ODA and 50 wt % BTDA with ODA;

(j) 50 wt % PMDA with ODA, comprising 15 wt % graphite and 50 wt % BPDA with PPD, comprising 2.5 wt % graphite;

(i) 60 wt % BPDA with 70 mol % PPD/30 mol % MPD, comprising 50 wt % graphite and 40 wt % PMDA with ODA, comprising 65 wt % graphite;

and (k) 40 wt % BPDA with 70 mol % PPD/30 mol % MPD, comprising 50 wt %

* * * * *